INVENTOR
OSCAR LOWENSCHUSS
BY Irving S. Rappaport
AGENT

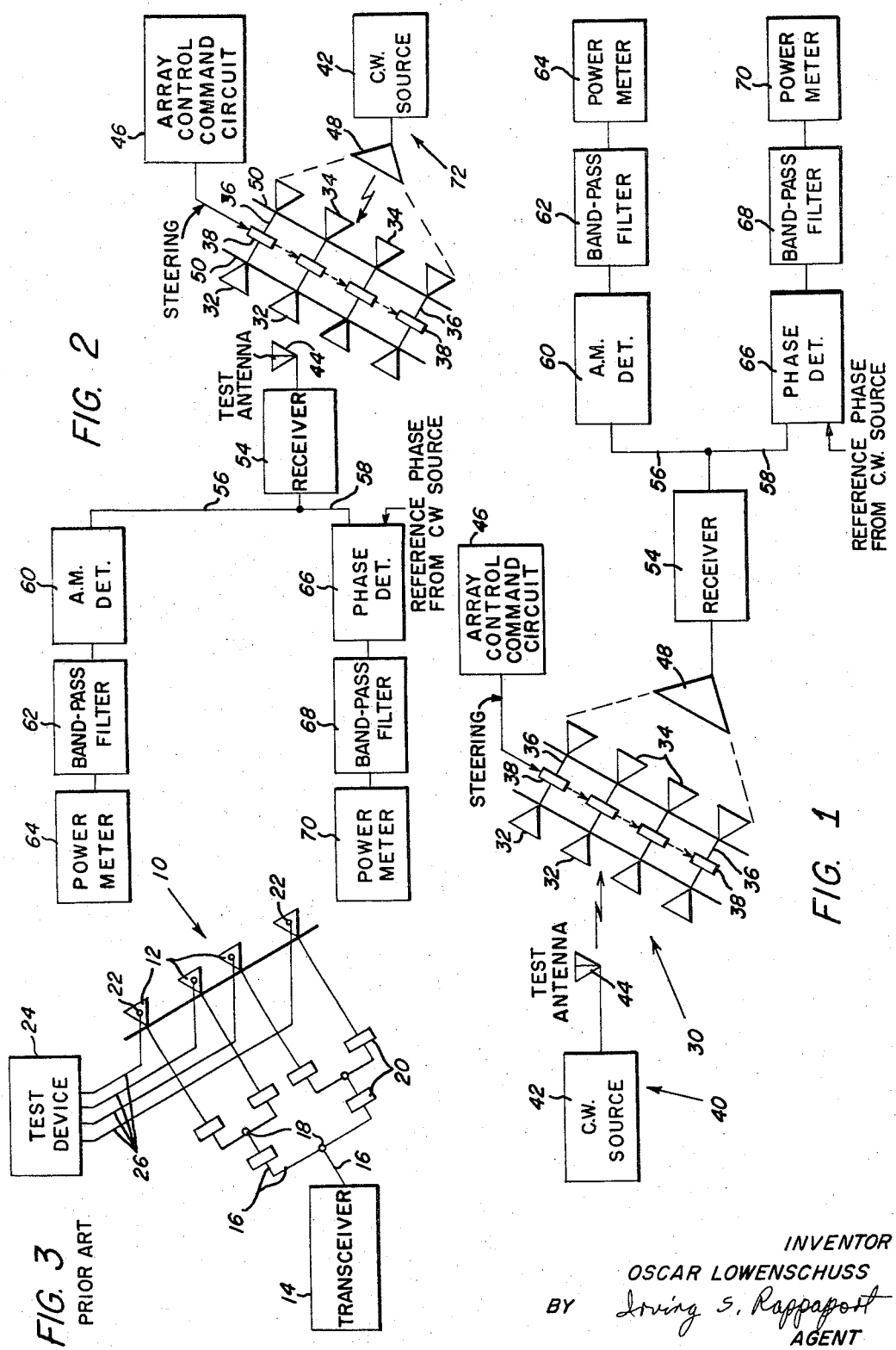

United States Patent Office 3,378,846
Patented Apr. 16, 1968

3,378,846
METHOD AND APPARATUS FOR TESTING PHASED ARRAY ANTENNAS
Oscar Lowenschuss, Lexington, Mass., assignor to Raytheon Company, Lexington, Mass., a corporation of Delaware
Filed Oct. 3, 1966, Ser. No. 583,668
23 Claims. (Cl. 343—100)

The following invention relates to phased array antennas and, more particularly, to a method and apparatus for testing phased array antennas.

Phased array antennas that can be steered electronically were originally designed for fixed-point high-frequency communications. In recent years as the speed of aircraft began to exceed the capabilities of rotating-antenna search radar, applications of phased array antennas to radar were considered. Today, the electronically steerable phased array antenna appears to be the best way to track or search many targets widely separated in space. An electronically steered phased array antenna can slew rapidly on a pulse-to-pulse basis throughout the entire azimuth and elevation region accessible to the radar, leading to multiple-target tracking capability. For space communications or radio astronomy, phased array antennas provide the maximum practical gain over other steerable antennas which suffer from limitations imposed by stress capabilities and manufacturing tolerances in materials. The gain which can be achieved by electronically steerable phased array radar antennas is limited only by the amount of land available and by dispersion along the propagation path. Phased array radar systems offer many advantages over mechanically swept antennas, the most notable being their ability to select a given azimuth and elevation pointing angle without physically moving the antenna. Hence, in principle, it is possible to select pointing angles more rapidly than with rotating antenna systems. For a more detailed discussion of phased array antennas refer to Allen, "Array Antennas: New Applications for an Old Technique," IEEE Spectrum, vol. 1, No. 1, November 1964, pages 115–130, and Lowenschuss, "Digital Control of Phased Array Antennas," Electronic Progress, vol. VIII, No. 3, spring 1964, pages 8–11.

An important problem in phased array antennas is the testing of the individual elements and phase shifters. Due to the large number of elements and the possible interaction between adjacent elements, accurate gain and phase shift measurements have been difficult and costly. Early phased array antennas consisted of very cumbersome series of corporate-fed arrays including many vacuum tubes and heavy cables. In order to test the individual elements of this system, it was necessary to provide a separate connection and radio frequency pickup device to a large number of elements of the array. Associated with each pickup device and connection was an elaborate test device. As a result of the need for a separate pickup device, connection and test device for large numbers of the elements of the array, testing of a phased array antenna was quite difficult and costly. In addition, early systems were not capable of having the phase shifters automatically individually adjusted. Also, because of the high power density surrounding a phased array antenna, a remote testing and adjustment system is highly desirable. Another very desirable characteristic of a phased array antenna testing system is a method which allows the individual elements to be tested with the radio frequency power on. This characteristic makes the system much more reliable and effective, since shutdown periods would create a critical danger in any radar defense system. Accordingly, it is an object of the present invention to overcome the difficulties and shortcomings of the prior art as stated above.

It is another object of the present invention to provide a method and apparatus for testing the elements of a phased array antenna system.

Still a further object of the present invention is to provide a method and apparatus for measuring the gain and phase shift of each individual element of a space-fed phased array antenna system.

Yet another object of the present invention is to provide a method and apparatus for accurately measuring the gain and phase shift of each individual element of a space-fed phased array antenna system with a limited amount of test circuitry.

The method and apparatus of the present invention includes the following features among other important aspects of the invention: (1) an indication of the condition of each individual phase shifter and its associated radiators, (2) automatic alignment from a remote location of each radiator and phase shifter of the system, (3) the physical location of each element and its impedance characteristics are not critical since the system provides for automatic alignment of each individual element, (4) the elimination of separate radio frequency pickup devices, connections and test devices associated with each individual element as required in prior art test systems, (5) an accurate measurement of the gain and phase shift of each individual element of the system, and (6) a testing system which allows the phased array antenna to transmit and receive during the testing of the individual element.

The above objects and advantages are achieved in the present invention by providing a method of individually testing each element of a phased array antenna wherein each element of the array has a B control bit phase shifter associated therewith, which comprises the steps of transmitting a reference signal to the elements of the array, switching the bits of the phase shifter associated with the element under test, and measuring the amplitude and phase modulations produced by the switching of the bits of the phase shifter.

The method of this invention is carried out by providing apparatus for individually testing each element of a phased array antenna wherein each element of the array has a phase shifter associated therewith, said apparatus comprising transmission means for transmitting a reference signal to the elements of the array, circuit means for varying the phase shifters for each element of the antenna one at a time, receiver means for receiving the resultant signals, and measuring means connected to the receiver for indicating the amplitude and phase modulation indices produced by the circuit means switching of the bits of the phase shifter associated with the element under test.

Other features and objects of the present invention will be made more apparent from the following specific description when taken in conjunction with the figures in which:

FIG. 1 is a schematic diagram embodying the phased array antenna test system apparatus of the present invention;

FIG. 2 is a schematic diagram embodying an alternative configuration of the system shown in FIG. 1;

FIG. 3 illustrates an example of a prior art phased array antenna system;

Figure 4A:
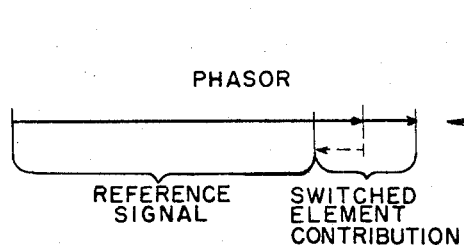
Figure 5A:
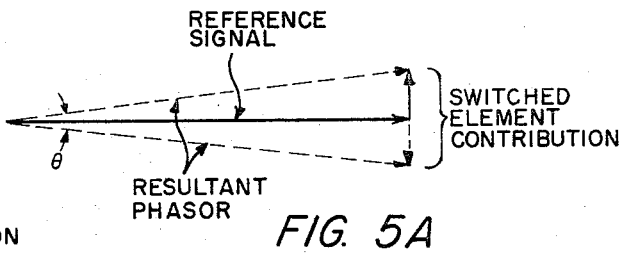

FIGS. 4A, B, C and D represent plots of the signals derived from the present test system; and FIGS. 5A, B, C and D represent another set of plots of the signals derived from the test system of this invention.

Similar reference characters are applied to similar elements throughout the drawings.

FIG. 3 shows a corporate-fed phased array antenna system which is representative of the prior art. The schematic of FIG. 3 shows a phased array antenna 10 having a plurality of radiators 12. A transceiver 14 is located in the near field of the antenna 10. The transceiver 14 is electrically connected to each of the radiators 12 of the antenna 10 by a system of cables and connectors. This corporate fed system derives its name from the fact that the cables connecting the transceiver to the individual radiators resemble the lines connecting the various functions in a corporate organization chart. Cables 16 connect the transceiver 14 to the individual radiators 12. A plurality of connectors 18 represent relatively complex pieces of equipment connected to the junctions where the cables 16 split into different branches. These connectors 18 act to properly transmit the signal from the junction points to the various branches of the cable as they diverge from the junctions. Phase shifters 20 for adjusting the various radiators 12 are located in the branches of the cables 16. In order to test the individual radiators 12 of the phased array antenna 10 of the prior art, it is necessary to connect separate radio frequency pickup devices 22 to each radiator 12. Each pickup device 22 is connected to a test device 24 by means of individual connections 26. Since each radiator 12 of the antenna 10 requires a separate pickup device 22 and connection 26 leading to the test device 24, the system quickly becomes very cumbersome, costly and difficult for measuring the gain and phase shift of each individual radiator 12.

In the method of the present invention, the whole antenna is illuminated by a test signal with the result that the characteristics of the output from each element of the antenna is measured in the presence of the large reference signal which is due to the sum of the outputs from all the other elements not under test. By switching a single bit of the phase shifter associated with the element under test in and out at a precise rate and duty cycle, some of the energy transmitted by the element under test is removed in frequency from the vicinity of the reference signal. A frequency sideband thus generated can then be isolated from the reference signal by filtering. Since the sideband contains the element phase shift and gain characteristics, these can be derived if a sufficient number of measurements are made.

FIG. 1 illustrates a schematic block diagram of the apparatus for testing a phased array antenna of the present invention. Included in the system is a transmission, parallel space-fed phased array antenna 30 having N number of elements including transmitting radiators 32. Each radiator 32 is spaced a prescribed distance from its surround neighbors. Associated with each radiator 32 of the antenna 30 is a receiving radiator 34 connected to its associated transmitting radiator 32 by a transmission line 36. Electrically connected between each transmitting radiator 32 and its associated receiving radiator 34 is a phase shifter 38. Each phase shifter 38 has B control bits to select the desired phase increment.

For a detailed discussion of the phase shifters and their theory of operation, see Sobel, "Design Considerations for an Advanced Beam Steering Computer," Electronic Progress, vol. X, Nos. 1 and 2, spring/summer 1966, pages 2–12.

A test device 40 comprising a CW transmitting source 42 connected to a test antenna 44, is remotely located in the field of the antenna 30 and within the steering capabilities of the main lobe of the antenna 30. The test device 40 is used for transmitting a reference signal to the elements of the array which is used in testing each element of the antenna 30. An array control command circuit 46 is provided for producing array control commands for steering the antenna 30 by means of the phase shifters 38 so that the test device 40 lies in the main lobe of the antenna 30. The array control commands are provided for varying the phase shifters 38 associated with each element, one at a time, in a prescribed manner. The array control command circuit 46 is electrically connected to each phase shifter 38, as shown by the dotted lines connecting the phase shifters. For a complete description of the circuitry for providing the array control commands see Sobel, "Design Considerations for an Advanced Digital Beam Steering Computer," Electronic Progress, vol. X, Nos. 1 and 2, spring/summer 1966, pages 2–12.

A large radiator 48 located in the near field of the phased array antenna 30 is provided to pick up the radiations from radiators 34 as the phase shifters 38 are steered by the circuit 46 upon receiving the array control commands.

The signals picked up by the radiator 48 are fed to a receiver 54. The receiver 54 employs conventional receiver techniques for processing the received energy. The signals observed at the output of the receiver 54 are distributed between two branches 56 and 58. The branch 56 includes an A-M detector 60 whose output is fed to a bandpass filter 62. The A-M detector 60 detects any amplitude-modulated signal from the receiver 54 and sends it into the bandpass filter 62. The bandpass filter 62 is arranged to separate the amplitude-modulated portion of the signal from the reference signal. A power meter 64 is connected to the output of the bandpass filter 62 to indicate the amount of amplitude-modulation. The other branch 58 includes a phase or synchronous detector 66 for detecting any phase-modulated signal. The output of the detector 66 is fed to a bandpass filter 68 which separates the phase-modulated signal from the reference signal. A power meter 70 is connected to the output of the bandpass filter 68 to give an indication of the amount of phase modulation by establishing the relation between the amplitude of the phase-modulated signal relative to the reference signal. The phase detector 66 in addition to being fed by the phase-modulated output from receiver 54 also has a reference phase from the CW transmitting source 42 applied thereto. The components of the system including the receiver 54, A-M detector 60, phase detector 66, bandpass filters 62 and 68 and power meters 64 and 70 are conventional electronic components whose description may be found in a reference such as Ryder, Electronic Fundamentals and Applications.

FIG. 2 shows an alternative embodiment of the testing system shown in FIG. 1. The alternative embodiment of FIG. 2 merely entails an interchange of the CW transmitting source 42 and the receiver 54 and its associated apparatus as shown in FIG. 1. In this embodiment a test device 72 is provided which is located in the near field of the antenna 30 and is comprised of the CW transmitting source 42 connected to the radiator 48. The receiver 54 with its output branches 56 and 58 is connected to the test antenna 44 within the field of the antenna 30. As in FIG. 1 branch 56 includes the A-M detector 60, bandpass filter 62 and power meter 64 connected to the output of the receiver 54, while the branch 58 includes the phase detector 66, bandpass filter 68 and power meter 70 connected to the output of the receiver 54. In the operation of this embodiment, the CW source 42 transmits a reference signal to the elements of the array—radiators 32 and 34 and phase shifters 38—via the radiator 48. The signals transmitted to the elements of the array act to vary the individual phase shifters which variance is received by receiver 54 via the test antenna 44. The operation of both the test systems shown in FIGS. 1 and 2 are basically the same and will now be described in more detail.

Although the test system of this invention has been shown as employed with a transmission space-fed phased array antenna, it could equally well be employed with a reflection space-fed array since the basic approach to varying the individual phase shifters would be the same as in the present description.

The directivity of the array, which is defined as the ratio of the power density per unit solid angle to the average power radiated per unit solid angle overall space, depends on N, the number of elements in the array. On either transmission or reception of the phased array antenna, the output is proportional to the sum of the N components, each weighted by the proper phase amplitude characteristic of a given element. For uniform aperture illumination the vector length when all components arrive in phase is N units long. This vector relationship can be seen in FIG. 4A.

The method of operation of the invention will be described in conjunction with the embodiment of FIG. 1 although the basis of operation is the same for the embodiment shown in FIG. 2. The method and apparatus embodying the present invention operate as follows: each radiator 32 of the antenna 30 has a phase shifter 38 having several control bits associated therewith, which for purposes of description will be termed a B bit digitally controlled phase shifter. Phase shifters 38 may be either digitally controlled analog or digital phase shifters. One particular test sequence will now be described but other test sequences may be employed.

The phase shifter associated with the element under test is switched back and forth periodically between two states such that the phase shifter remains in each state for T number of seconds. This switching is used to test the operation of the various bits in each of the phase shifters in the array. The switching rate may be such that the given phase shifter associated with the element under test may be modulated at a 20 to 30 kc. rate while the corresponding deviation and/or amplitude-modulation are monitored. This switching action varies the phase of the R.F. signal received by the element whose phase shifter is being switched. The switching action of the phase shifter associated with the element under test is accomplished by the array control command circuit 46.

Figure 4B:
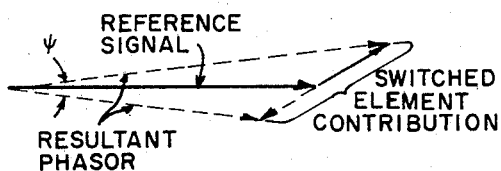
Figure 4C:
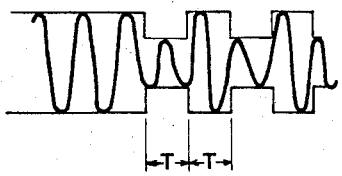
Figure 4D:
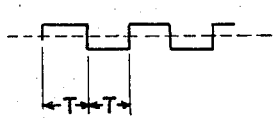

As mentioned previously, the antenna 30 contains N elements, each having a B control bit digitally controlled phase shifter 38 associated therewith. The CW signal transmitted by the test device 40 is passed by the $N-1$ unswitched elements and acts as a reference signal. If the highest order bit of the phase shifter is switched back and forth periodically between two states—the "0" and the "1" states—then the signal contributed by the switching action of the individual element under test will alternately add to and substract from the reference signal. The highest-order bit controls a 180° phase shift. This 180° switching action is illustrated by FIG. 4A for an ideal switched element, in which is shown a phasor made up of the reference signal which is composed of the contribution from the $N-1$ unswitched elements and the contribution from the switched element which is shown as adding to the contribution of the reference signal by the full line and as subtracting from the contribution of the reference signal by the dotted line. The case shown in FIG. 4A represents the situation where the element under test is correctly aligned; if it is incorrectly aligned, the phasors will add as shown in FIG. 4B. A misaligned element which produces a phasor such as in FIG. 4B includes both amplitude and phase-modulation. The signal which results from the phasor of FIG. 4A, which is shown in FIG. 4C, is picked up by the radiator 48 and received by the receiver 54. When this signal is received, it is equivalent to an R.F. carrier that is amplitude-modulated with a square wave of frequency ½T cycles per second and has no phase modulation. The output of the receiver 54 is applied to the A-M detector 60 whose output is fed to the bandpass filter 62. The bandpass filter 62 is centered at ½T cycles per second and acts to separate the amplitude-modulation shown in FIG. 4D from the modulated signal shown in FIG. 4C. The signal of 4D is fed to the power meter 64 which yields an indication of the amount of amplitude-modulation by providing a measure of the modulation index. In addition, the output of receiver 54 is fed to the phase detector 66 together with a reference phase signal from the CW source 42. The output of phase detector 66 is fed to the bandpass filter 68 which is centered at ½T cycles per second and acts to separate the phase modulation from the modulated signal. The signal is measured by means of power meter 70. If the switched element is behaving ideally and its phasor contribution is as shown in FIG. 4A, then there will be no phase modulation, and power meter 70 will indicate zero. If the switched element is not behaving ideally and its phasor contribution is as shown in FIG. 4B, then there will be both amplitude and phase modulation indicated by power meters 64 and 70 respectively.

If the antenna 30 under test uses uniform aperture illumination, and if the element under test is operating in an ideal manner, then the amplitude-modulation index of the square wave received will be $$\frac{1}{N-1}$$

and the phase modulation index will be zero. On the other hand if a nonuniform aperture illumination is used, the amplitude-modulation index resulting for each element in the array can be calculated or calibrated before the measurement is made. If the observed amplitude or phase modulation index for a particular switched element differs from that which had been obtained previously, then the gain or phase shift of the switched element has changed, or else the phase shifter associated with the element under test is not introducing a 180° phase shift.

Figure 5B:
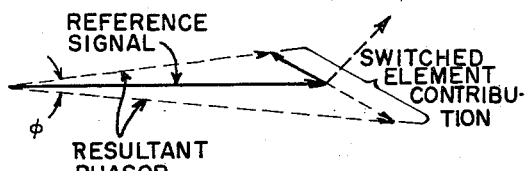
Figure 5C:
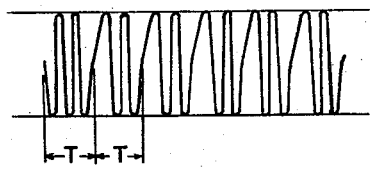
Figure 5D:
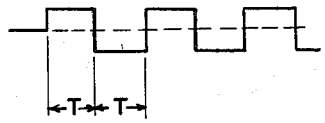

After the result of the 180° phase shift switching of the highest-order bit has been measured, the two highest-order bits are switched in the following manner. The second highest-order bit of the same phase shifter associated with the element under test is inverted by introducing an additional ±90° phase shift, and then the highest-order bit is switched back and forth periodically between the "0" and "1" states, remaining in each state for T number of seconds. This switching action is illustrated in FIG. 5A. As seen in FIG. 5A the long horizontal arrow represents the contribution from the $N-1$ unswitched elements of the reference signal while the two short vertical arrows—solid and dashed—represent the contribution to the signal from the switched element in its two states. The resultant phasors are shown by the two dotted slanted arrows. The effect of the switching as illustrated in FIG. 5A is a phase modulated signal contribution from the element under test with a phase deviation corresponding to the angle $\theta$. Furthermore, no amplitude modulation is observed on power meter 64, provided that the phase shift is precisely ±90°. However, if the phase shift of the switched element differs from ±90°, a residual amplitude modulation will be detected by the A-M detector 60 and measured by the power meter 64. Such a phase shift is illustrated in FIG. 5B. If aperture illumination is uniform, the phase detector 66 will indicate a phase modulation of peak deviation $$\frac{1}{N-1}$$

radians at a modulation frequency of ½T cycles per second, provided the switched element is behaving ideally. This signal detected by the phase detector 66 is illustrated in FIG. 5C. As the signal shown in FIG. 5C is applied to the bandpass filter 68 which is centered at ½T cycles per second, the phase modulation as represented by the plot in FIG. 5D will be separated from the reference signal and it becomes possible to establish the amplitude of this phase modulated portion of the signal relative to the CW reference signal resulting from the $N-1$ unswitched elements. By combining the amplitude and phase modulation measurements, any angle of phase shift and any gain can be measured and recorded for an individual element under test. This measurement is accomplished by inverting one or more bits at a time of this same phase shifter and then switching the highest-order bit back and forth periodically between the "0"

and "1" states. This switching action causes both amplitude and phase modulation, depending upon the precise phase shift and gain change introduced by that particular bit. By performing these switching tests in appropriate succession, it is possible to completely test the gain and phase contribution of every bit of the phase shifter of the associated element under test. This testing can be done with the element under test in place and with the system operating under full power so that mutual coupling effects of the system are preserved.

Thus, the test method and apparatus of the present invention allow not only for the measurement of the gain and phase shift characteristics of each individual element of the array but also allows for an automatic alignment from a remote location of the individual horns and phase shifters associated therewith, because the power meters 64 and 70 and the array control command circuit 46 can be remotely located. As a result of this flexibility, the physical location of the individual antenna elements and their impedance characteristics are not critical since the system may be automatically aligned in a very short period of time.

Thus the basis of the method and apparatus embodying the present invention includes the remote variance of each individual phase shifter associated with the individual element under test, which variance is used to indicate the gain and phase shift of the element under test.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A method of individually testing each element of a phased array antenna wherein each element of the array has a B control bit phase shifter associated therewith, which comprises the steps of:
   transmitting a reference signal to the elements of the array;
   switching the bits of the phase shifter associated with the element under test; and
   measuring the amplitude and phase modulation produced by said switching of the bits of said phase shifter.

2. A method for individually testing each element of a phased array antenna wherein each element of the array has a B control bit phase shifter associated therewith, which comprises the steps of:
   transmitting a reference signal to the elements of the array;
   switching predetermined bits of the phase shifter associated with the element under test in a prescribed sequence; and
   measuring any amplitude and phase modulation produced by said switching of said bits of said phase shifter.

3. A method for individually testing each element of a parallel-fed phase array antenna wherein each element of the array has a B control bit phase shifter associated therewith, which comprises the steps of:
   transmitting a reference signal to the elements of the array;
   switching the highest-order bit of the phase shifter associated with the element under test;
   measuring any amplitude and phase modulation produced by said switching the highest-order bit of said phase shifter;
   switching the two highest-order bits of said same phase shifter;
   measuring any amplitude and phase modulation produced by said switching of the two highest-order bits of said phase shifter;
   switching other bits of said phase shifter; and
   measuring any amplitude and phase modulation produced by said switching of the other bits of said phase shifter.

4. The method as set forth in claim 3 wherein:
   said switching of the highest-order bit of said phase shifter comprises a 180° phase shift back and forth periodically between two states such that said phase shifter remains in each state for a fixed interval.

5. The method as set forth in claim 3 wherein:
   said switching of the two highest-order bits of said phase shifter comprises a ±90° inversion of said second highest-order bit and a 180° phase shift of said highest-order bit back and forth periodically between two states such that said phase shifter remains in each state for a fixed interval.

6. The method as set forth in claim 3 wherein said measuring of the amplitude modulation includes:
   receiving the amplitude-modulated reference signal produced by switching the bits of the phase shifter associated with the element under test;
   detecting the amplitude-modulated reference signal;
   separating out the amplitude-modulated portion of said signal; and
   indicating the amount of amplitude modulation.

7. The method as set forth in claim 3 wherein said measuring of the phase modulation includes:
   receiving the phase modulated reference signal produced by switching the bits of the phase shifter associated with the element under test;
   detecting the phase modulated reference signal;
   separating out the phase modulated portion of said signal; and
   indicating the amount of phase modulation by establishing the amplitude of the phase modulated portion relative to said reference signal.

8. A method for individually testing each element of a parallel, space-fed phased array antenna wherein each element of the array has a B control bit digitally controlled phase shifter associated therewith which comprises the steps of:
   transmitting a reference signal to the elements of the array from a remote position located in the field of the antenna;
   switching the highest-order bit of the phase shifter associated with the element under test through a 180° phase shift back and forth periodically between two states such that said phase shifter remains in each state for the same fixed interval;
   measuring any amplitude and phase modulation produced by said switching of the highest-order bit of said phase shifter;
   switching the two highest-order bits of said same phase shifter such that said second highest-order bit is inverted ±90° and said highest-order bit is switched through a 180° phase shift back and forth periodically between two states such that said phase shifter remains in each state for a fixed interval;
   measuring any amplitude and phase modulation produced by said switching of the two highest-order bits of said phase shifter;
   switching other bits of said phase shifter; and
   measuring any amplitude and phase modulation produced by said switching of said other bits of said phase shifter.

9. The method as set forth in claim 8 wherein:
   said measuring of the amplitude modulation includes,
   receiving the amplitude-modulated reference signal;
   separating out the amplitude-modulated portion of said signal; and
   indicating the amount of amplitude modulation; and
   said measuring of the phase modulation includes,
   receiving the phase-modulated reference signal produced by switching the bits of the phase shifter associated with the element under test;

detecting the phase-modulated reference signal;
separating out the phase-modulated portion of said signal; and
indicating the amount of phase modulation by establishing the amplitude of the phase-modulated portion relative to said reference signal.

10. A method of individually testing each element of a parallel space-fed array antenna wherein each element of the array has a B control bit digitally controlled phase shifter associated therewith which comprises the steps of:
transmitting a reference signal from a remote position located in the field of the antenna and within the main lobe of the antenna;
switching the highest-order bit of the phase shifter associated with the element under test through a 180° phase shift back and forth periodically between two states such that said phase shifter remains in each state for T number of seconds;
receiving the signal produced by switching the highest-order bit of the phase shifter associated with the element under test;
detecting any amplitude modulation in the signal;
filtering out the amplitude-modulated portion of said signal, said filtering being centered at ½T cycles per second;
metering the amount of amplitude modulation;
switching the two highest-order bits of said same phase shifter such that said second highest-order bit is inverted ±90° and said highest-order bit is switched through a 180° phase shift back and forth periodically between two states such that said phase shifter remains in each state for T number of seconds;
receiving the signal produced by switching the two highest-order bits of the phase shifter associated with the element under test;
detecting any phase modulation in the signal;
filtering out the phase-modulated portion of said signal, said filtering being centered at ½T cycles per second;
metering the amount of phase modulation by establishing the amplitude of the phase-modulated portion relative to said reference signal;
switching other bits of said phase shifter; and
measuring any amplitude and phase modulation produced by said switching of said other bits of said phase shifter.

11. Apparatus for individually testing each element of a phased array antenna wherein each element of the array has a B control bit phase shifter associated therewith, said apparatus comprising:
transmission means for transmitting a reference signal to the elements of the array;
circuit means for varying the phase shifters for each element of the array one at a time;
receiver means for receiving the resultant signals; and
measuring means connected to said receiver for indicating the amplitude and phase modulation indices produced by the circuit means switching of the bits of the phase shifter associated with the element under test.

12. Apparatus as set forth in claim 11 wherein said transmission means comprises:
test means remotely located from the phased array antenna which includes a CW source connected to a radiating device, said test means being located in the field of the phased array antenna and within the main lobe of said antenna.

13. Apparatus as set forth in claim 11 wherein:
said circuit means includes computer circuitry for providing array control commands for steering the array by varying the individual phase shifters.

14. Apparatus as set forth in claim 11 wherein said measuring means includes:
an amplitude modulation detector connected to said receiver for detecting any amplitude-modulated signal produced by the switching of the bits of the phase shifter associated with the element under test;
a bandpass filter connected to said A-M detector for separating the amplitude-modulated portion of the signal from the reference signal;
a power meter connected to said filter for indicating the amplitude modulation index;
a phase detector connected to said receiver for detecting any phase-modulated signal produced by the switching of the bits of the phase shifter associated with the element under test;
a bandpass filter connected to said phase detector for separating the phase-modulated portion from the reference signal; and
a power meter connected to said filter connected to said phase detector for indicating the amplitude of the phase-modulated signal relative to the reference signal.

15. Apparatus for individual testing each element of a parallel-fed phased array antenna wherein each element of the array has a B control bit digitally controlled phase shifter associated therewith, said apparatus comprising:
test means including a CW source connected to a radiating device for transmitting a reference signal to the elements of the array, said test means being remotely located in the field of the array and within the main lobe of said array;
computer circuitry for providing array control commands for steering the array by switching the bits of the phase shifters for each element of the array one at a time in a predetermined sequence;
receiver means for receiving the resultant signals as the phase shifters are individually varied;
first measuring means connected to said receiver for indicating any amplitude modulation index produced by the computer circuitry switching of the bits of the phase shifter associated with the element under test, said first measuring means including;
detection means connected to said receiver for detecting the amplitude-modulated signal produced by the switching of the bits of the phase shifter associated with the element under test;
filtering means connected to said detection means for separating the amplitude-modulated portion of the signal from the reference signal;
metering means connected to said filtering means for indicating the amplitude modulation index;
second measuring means connected to said receiver means for indicating any phase modulation index produced by the computer circuitry means switching of the bits of the same phase shifter associated with the element under test, said second measuring means including;
detection means connected to said receiver for detecting the phase-modulated signal produced by the switching of the bits of the phase shifter associated with the element under test;
filtering means connected to said detection means for separating the phase-modulated portion from the reference signal; and
metering means connected to said filtering means for indicating the amplitude of the phase-modulated signal realtive to the reference signal.

16. Apparatus for individually testing each element of a parallel-fed phased array antenna wherein each element of the array has a B control bit digitally controlled phase shifter associated therewith, said apparatus comprising:
a test device including a CW source connected to a radiating device for transmitting a reference signal to the elements of the array, said test device being remotely located in the field of the array and within the main lobe of said array;
switching means for switching the bits of the phase shifter associated with the element under test in a predetermined sequence;

receiver means for receiving the resultant signals from the switching of the bits of said phase shifter;

detection means for detecting the amplitude-modulated reference signals received from the switching of the bits of said phase shifter;

filtering means for filtering out the amplitude-modulated portion of said signal;

metering means for indicating the amount of amplitude modulation;

detection means for detecting the phase-modulated reference signals received from the switching of the bits of said phase shifter;

filtering means for filtering out the phase-modulated portion of said signal; and metering means for indicating the amount of phase modulation by establishing the amplitude of the phase-modulated portion relative to said reference signal.

17. Apparatus as set forth in claim 16 wherein said predetermined sequence of said switching means may include switching the highest-order bit of said phase shifter through a 180° phase shift back and forth periodically between two states such that said phase shifter remains in each state for the same fixed interval.

18. Apparatus as set forth in claim 17 wherein said same fixed interval is T number of seconds and said amplitude-modulation filtering means is a bandpass filter centered at ½T cycles per second.

19. Apparatus as set forth in claim 16 wherein said predetermined sequence of said switching means may include switching the two highest-order bits of said phase shifter such that said second highest-order bit is inverted ±90° and said highest-order bit is switched through a 180° phase shift back and forth periodically between two states such that said phase shifter remains in each state for said same fixed interval.

20. Apparatus as set forth in claim 19 wherein said same fixed interval is T number of seconds and said phase-modulation filtering means is a bandpass filter centered at ½T cycles per second.

21. Apparatus for individually testing each element of a parallel, space-fed phased array antenna wherein each element of the array has a B control bit digitally controlled phase shifter associated therewith, said apparatus comprising:

a test device including a CW source connected to a radiating device for transmitting a reference signal to the elements of the array, said test device being remotely located in the field of the array and within the main lobe of said array;

switching means for switching the bits of the phase shifter associated with the element under test, wherein said switching may include switching the highest-order bit of said phase shifter through a 180° phase shift back and forth periodically between two states such that said phase shifter remains in each state for T number of seconds, switching the two highest-order bits of said same phase shifter wherein such switching may include inverting said second highest-order bit ±90° and switching said highest-order bit through a 180° phase shift back and forth periodically between two states such that said phase shifter remains in each state for T number of seconds, and switching the other bits of said phase shifter through phase shifts between two states such that said phase shifter remains in each state for T number of seconds;

receiver means for receiving the resultant signals from the switching of said phase shifter;

detection means for detecting the amplitude-modulated reference signal received from the switching of the bits of said phase shifter;

filtering means for filtering out the amplitude-modulated portion of said signal, said filtering means being a bandpass filter centered at ½T cycles per second;

metering means for indicating the amount of amplitude modulation;

detection means for detecting the phase-modulated reference signal received from the switching of the bits of said phase shifter;

filtering means for filtering out the phase-modulated portion of said signal, said filtering means being a bandpass filter centered at ½T cycles per second; and metering means for indicating the amount of phase modulation by establishing the amplitude of the phase-modulated portion relative to said reference signal.

22. Apparatus as set forth in claim 21 wherein said radiating device of said test device is a test antenna.

23. Apparatus as set forth in claim 21 wherein said radiating device of said test device is a radiator and said test device is located in the near field of said array.

References Cited

UNITED STATES PATENTS

| | | | |
|---|---|---|---|
| 2,185,059 | 12/1939 | Kear et al. | 343—100 |
| 2,196,590 | 4/1940 | Koch | 343—703 |
| 3,166,748 | 1/1965 | Shanks et al. | 343—100 |
| 3,213,453 | 10/1965 | Morrison et al. | 343—113 |
| 3,249,941 | 5/1966 | Royce | 343—100 |
| 3,273,065 | 9/1966 | Stover | 325—67 |

RODNEY D. BENNETT, *Primary Examiner.*

H. C. WAMSLEY, *Assistant Examiner.*